July 7, 1970        T. J. SHORES        3,519,304

PIPE TWISTING TOOL

Filed Oct. 18, 1968

INVENTOR.
THEODORE J. SHORES,
BY
Berman, Davidson & Berman
ATTORNEYS.

United States Patent Office

3,519,304
Patented July 7, 1970

3,519,304
PIPE TWISTING TOOL
Theodore J. Shores, 110 W. Spruce,
Liberal, Kans. 67901
Filed Oct. 18, 1968, Ser. No. 768,683
Int. Cl. B25b 5/04
U.S. Cl. 294—97                                    3 Claims

ABSTRACT OF THE DISCLOSURE

A tool for pulling apart pipe. The tool includes an elongated tubular sleeve housing a relatively reciprocable operating rod. Pivotably connected between a bracket fixed to the end of the rod and a bracket fixed to the sleeve intermediate its ends are a pair of approximately semicircular gripping shoes. The gripping shoes are pivotable relative to the longitudinal axis of the operating rod by reciprocation of the operating rod relative to the sleeve, so that the shoes can be moved into and out of frictional engagement with the pipe interior. Once frictional engagement is accomplished, the pipe can be twisted by rotating the tool, and then moved linearly.

---

This invention relates to a tool, and more particularly, a tool for twisting pipe and separating pipe joints.

The tool of the present invention is useful for removing and replacing a pipe wherein a plurality of pipes or tubes are generally connected in a string, such as irrigation pipe.

Irrigation pipe, usually made from aluminum becomes, very slick when wet or damp, and is very difficult to handle with the bare hands or even gloves. The ends of the pipe are joined by forcing a male coupling member connected to one pipe into a female coupling member connected to the next pipe in the string, the joint being sealed by a rubber gasket that supplies considerable resistance to uncoupling the pipe for replacement.

Accordingly, it is an object of this invention to provide a tool for frictionally gripping the interior of a slick cylindrical pipe, twisting the pipe to break any seal resisting movement of the pipe, and then moving the pipe linearly to break its coupling to an adjacent pipe.

Further objects and advantages of the invention will become apparent from the following description and claims, and from the accompanying drawings, wherein:

Figure 1:
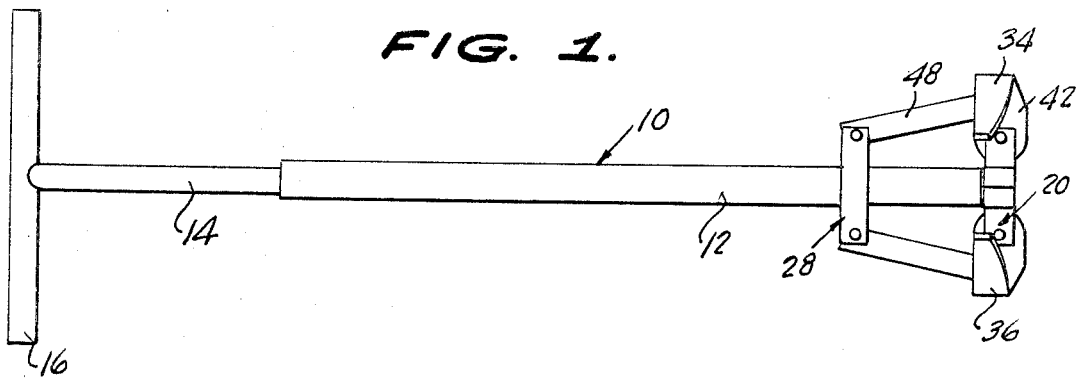
FIG. 1 is a front view in elevation of the pipe twisting tool of the present invention.
Figure 2:
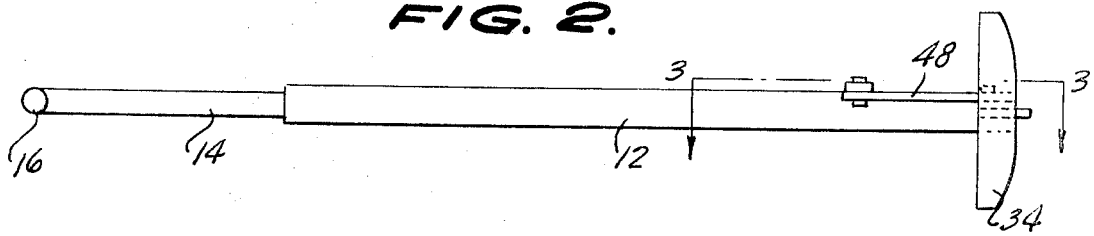
FIG. 2 is a top plan view of the tool shown in FIG. 1.

Referring now to the drawing in detail, wherein like numerals indicate elements throughout the several views, the pipe twisting tool is generally indicated by the numeral 10.

The tool 10 includes an elongated tubular sleeve 12, telescopically receiving an operating rod 14, reciprocable within the sleeve. At one end, operating rod 14 is provided with a laterally extending handle or grip 16 for pushing, pulling and twisting rod 14 within sleeve 12. At its other end, rod 14 includes an externally threaded portion 18 for coupling to a bracket 20.

Bracket 20 comprises a hexagonal nut 22 threadedly connected to the threaded portion 18 of rod 14, and a pair of planar projections 24 and 26, welded to nut 22 and extending laterally of the longitudinal axis of rod 14. A second bracket 28 is welded to sleeve 12 intermediate its ends, and includes a pair of planar projections 30 and 32 on opposite sides of the longitudinal axis of rod 14.

A pair of complementally shaped or approximately semi-circular gripper shoes 34 and 36 are provided for frictionally engaging the interior surface 38 of a cylindrical pipe 40. For quick pivotal movement into and out of gripping engagement with pipe 40, gripper shoe 34 includes a planar, radial projection 42 pivotally connected by a stud 44 to lateral projection 24 of bracket 20. Radial projection 42 is also pivotably connected by a stud 46 to one end of a link 48. Link 48 is pivotably connected at its opposite end to lateral projection 30 of bracket 28 by a stud 50.

Similarly, gripper shoe 36 includes a planar, radial projection 52 pivotally connected by a stud 54 to lateral projection 26 of bracket 20, on the opposite side of the longitudinal axis of rod 14. Radial projection 52 is also pivotably connected by a stud 56 to one end of a link 58. Link 58 is pivotably connected at its opposite end to lateral projection 32 of bracket 28 by a stud 60.

Figure 5:
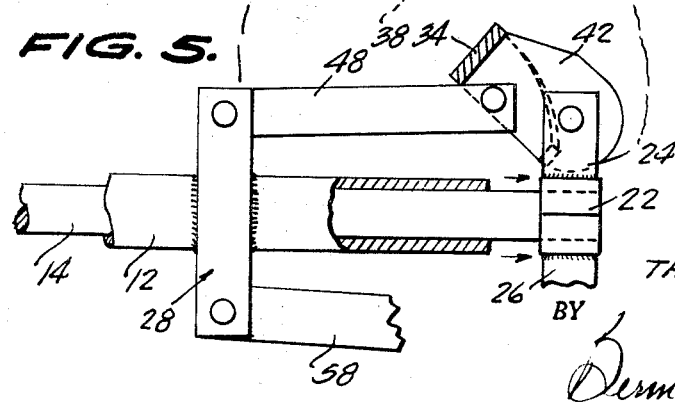
FIG. 5 is a view similar to FIG. 3, but illustrating the manner in which the tool is released from gripping engagement with the pipe.

In use and operation, tool 10 is inserted within the interior of pipe 40, as shown in FIG. 5. Rod 14 is pushed forward by handle 16, moving nut 22 away from the end of sleeve 12. This will cause gripper shoes 34 and 36 to pivot towards the longitudinal axis of rode 14 to an extent where contact with the interior surface 38 of pipe 40 is precluded.

Figure 3:
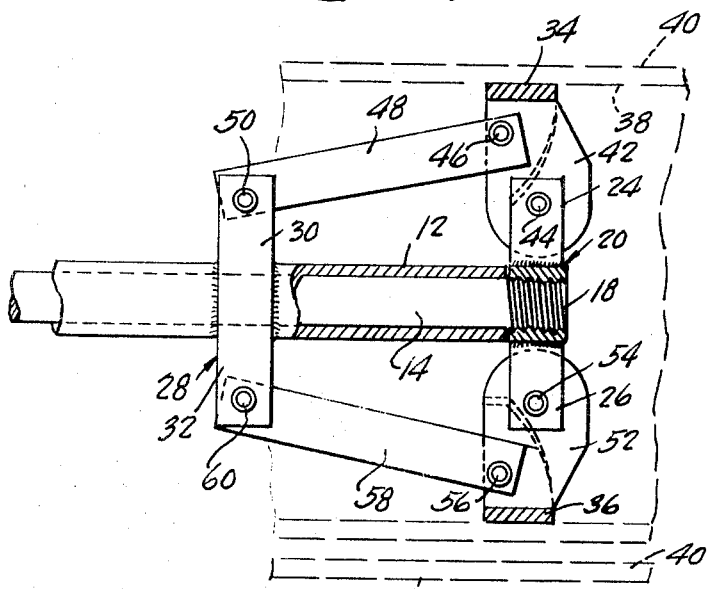
FIG. 3 is a cross-sectional view taken substantially along the plane indicated by line 3—3 of FIG. 2, with certain portions broken away to illustrate the details of construction, and further illustrating the manner in which the tool is used to grip the interior of a cylindrical pipe shown in phantom lines.
Figure 4:
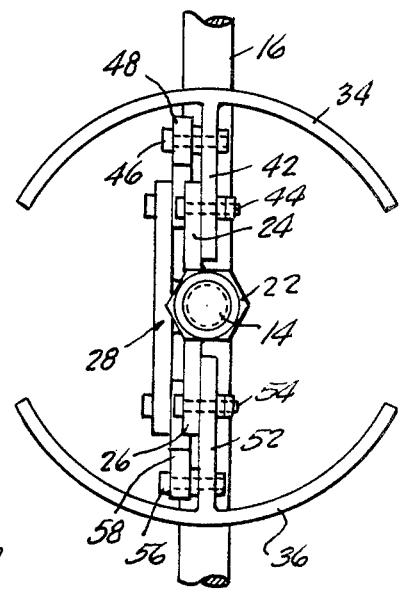
FIG. 4 is an end view in elevation of the pipe twisting tool as seen from the right-hand side of FIG. 3.

Once tool 10 is thus positioned within pipe 40, operating rod is pulled back by handle 16, causing gripper shoes 34 and 36 to pivot away from the longitudinal axis of the operating rod, until they frictionally engage and lockingly grip the interior surface 38 of pipe 40, as shown in FIG. 3. Handle 16 can then be rotated to rotate gripper shoes 34 and 36 and pipe 40 to overcome any resistance to movement of the pipe. Pipe 40 can then be moved linearly with tool 10.

While a specific embodiment of my invention has been disclosed in the foregoing description, it will be understood that various modifications within the spirit of the invention may occur to those skilled in the art.

I claim:

1. An implement for separating pipe joints comprising an elongated tubular sleeve, an operating rod reciprocable within said sleeve having a threadable nut secured at one end, first bracket means rigidly secured to said nut projecting laterally thereof, second bracket means fixed to said sleeve intermediate its ends and projecting laterally thereof, a pair of pipe-gripping shoes complemental in shape to the interior surface of said pipe, and mechanical means connecting said gripping shoes to said first and second bracket means on opposite sides of said operating rod for pivotal arcuate movement of said shoes relative to the longitudinal axis of said operating rod upon reciprocation of said rod relative to said sleeve, said mechanical means including a planar radial projection centrally disposed on the inner surface of said shoes having a pair of spaced pin-receiving apertures, said projection pivotally secured at its lower aperture to the lateral end of said first bracket means, a link pivotally secured at its forward end to said projection at its upper aperture and pivotally secured at its rearward end to the lateral end of said second bracket means, whereby said shoe may be releasably placed in frictional gripping engagement with the interior surface of said pipe, and upon frictional engagement said pipe can be twisted and moved.

2. An implement in accordance with claim 1 wherein said operating rod includes a handle bar fixed to its other end, said handle bar extending laterally to opposite sides of said operating rod, whereby it can be used to push and pull said operating rod and can rotate it to twist said pipe after the gripping shoes are in frictional engagement with the interior surface thereof.

3. An implement in accordance with claim 1 wherein said gripping shoes are approximately semi-circular in shape.

References Cited

UNITED STATES PATENTS

| | | | |
|---|---|---|---|
| 2,571,244 | 10/1951 | Hollander | 294—57 X |
| 2,879,101 | 1/1956 | Daroci | 294—97 |
| 3,104,126 | 9/1963 | Lovash | 294—97 |

FOREIGN PATENTS 799,176  8/1958  Great Britain.

EVON C. BLUNK, Primary Examiner

D. D. WATTS, Assistant Examiner